United States Patent
Deumier et al.

(10) Patent No.: US 10,743,555 B2
(45) Date of Patent: Aug. 18, 2020

(54) METHOD FOR DRYING FOOD PRODUCTS

(71) Applicant: LUTETIA, Plailly (FR)

(72) Inventors: François Deumier, Montmorency (FR); Jean-Claude Frenot, Arnouville (FR); Philippe Longo, Meudon (FR)

(73) Assignee: Provisur Technologies, Inc., Chicago, IL (US)

( * ) Notice: Subject to any disclaimer, the term of this patent is extended or adjusted under 35 U.S.C. 154(b) by 130 days.

(21) Appl. No.: 14/653,558

(22) PCT Filed: Dec. 11, 2013

(86) PCT No.: PCT/IB2013/060818
§ 371 (c)(1),
(2) Date: Jun. 18, 2015

(87) PCT Pub. No.: WO2014/097059
PCT Pub. Date: Jun. 26, 2014

(65) Prior Publication Data
US 2015/0342204 A1    Dec. 3, 2015

(30) Foreign Application Priority Data

Dec. 18, 2012 (FR) .................................. 12 62278

(51) Int. Cl.
*F26B 5/04* (2006.01)
*A23B 4/005* (2006.01)
(Continued)

(52) U.S. Cl.
CPC .............. *A23B 4/005* (2013.01); *A23B 4/002* (2013.01); *A23B 4/01* (2013.01); *A23B 4/023* (2013.01);
(Continued)

(58) Field of Classification Search
CPC ........... A23B 4/005; A23B 4/002; A23B 4/00; A23B 4/01; A23B 4/02; A23B 4/03;
(Continued)

(56) References Cited

U.S. PATENT DOCUMENTS 2,346,232 A * 4/1944 Piret ..................... A23B 4/03
426/332
4,127,947 A * 12/1978 Webb ..................... A23B 7/02
34/403
(Continued)

FOREIGN PATENT DOCUMENTS

EP    0085426 A1    8/1983
EP    1066762 A1    1/2001
(Continued)

OTHER PUBLICATIONS

Jun. 20, 2014 International Search Report issued in International Patent Application No. PCT/IB2013/060818.
(Continued)

*Primary Examiner* — John P McCormack
(74) *Attorney, Agent, or Firm* — Klintworth & Rozenblat IP LLP

(57) ABSTRACT

A method for drying a food product includes the step of: a) inserting the food product in an enclosure, the enclosure being defined by the vessel of a mixer; and b) drying the food product in the enclosure by applying a vacuum to the enclosure. The supplying of heat to the product located inside the enclosure is carried out when the vacuum is applied to the enclosure during step b) such as to maintain and/or increase the temperature of the product during all or part of the process of drying by applying a vacuum to the enclosure. The supplying of heat is carried out by heat
(Continued)

transfer between at least one heat-transfer fluid and the product and/or by irradiating the product with electromagnetic radiation.

19 Claims, 6 Drawing Sheets

(51) Int. Cl.
  *A23B 4/03* (2006.01)
  *A23L 3/40* (2006.01)
  *A23B 4/023* (2006.01)
  *A23B 4/01* (2006.01)
  *A23B 4/00* (2006.01)

(52) U.S. Cl.
  CPC ............... *A23B 4/03* (2013.01); *A23L 3/40* (2013.01); *Y02A 40/946* (2018.01)

(58) Field of Classification Search
  CPC ......... A23B 4/037; A23B 4/023; A23B 4/015; A23B 4/021; A23B 4/031; A23L 3/40; A23L 3/00; A23L 3/005; A23L 3/10; A23L 3/16
  USPC ... 34/412, 406, 385, 382, 381, 380, 192, 92, 34/402, 403
  See application file for complete search history.

(56) References Cited

U.S. PATENT DOCUMENTS

| 4,640,020 A | * | 2/1987 | Wear | F26B 5/041 219/701 |
| 2010/0132210 A1 | * | 6/2010 | Kruger | B01F 7/088 34/259 |
| 2012/0015074 A1 | * | 1/2012 | Draganski | A23B 4/03 426/59 |

FOREIGN PATENT DOCUMENTS

| EP | 1321041 A1 | 6/2003 |
| EP | 2371222 A1 | 10/2011 |
| FR | 1026186 A | 4/1953 |

OTHER PUBLICATIONS

Jun. 20, 2014 Written Opinion issued in International Patent Application No. PCT/IB2013/060818.

* cited by examiner

METHOD FOR DRYING FOOD PRODUCTS

The subject of the present invention is a method for drying food products, notably meat-based, in a mixer.

Meat-based food products essentially cover cooked meat products such as ham and cured meat products such as, for example, bacon, dried ham, fillet of duck breast, or even the meat products known by the names of coppa (loin-based), pancetta (bacon-based), thinly-sliced dried beef, bresi, and certain parts of poultry. All these products may, during their production, require a mixing which is generally performed in a vacuum.

The mixing is typically performed in a mixer which may comprise a hermetically sealed tank, mounted to rotate about its longitudinal axis which is substantially horizontal or, if appropriate, inclined relative to the ground. The enclosure is defined by the tank, it is sealed by a tight door, and may have a vacuum applied to it.

The mixer, in a vacuum, is an equipment item used in cooked meat production/salting to perform operations such as defrosting, salting, marinating, cooking or even smoking.

The document FR 1 026 186 describes a procedure for producing dry sausage in which the meat is mixed in a vacuum, with a vacuum of 50 to 70 cm of mercury, or 670 to 933 mbar. In some embodiments, the mixer is provided with a heating system.

The document EP 0 085 426 describes a method for drying vegetable materials in a mixer tank, equipped with a system for heating and applying a partial vacuum, of 350 to 60 torr, i.e. 466-78 mbar.

Figure 1:
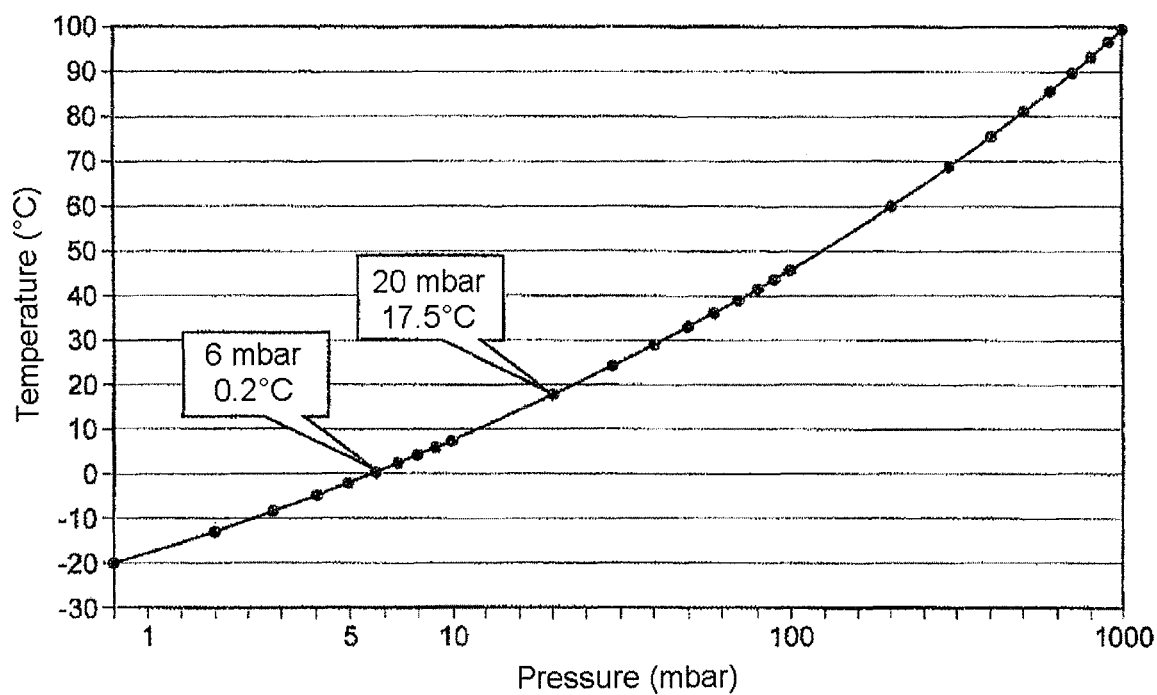

The application of a vacuum for food products may make it possible to perform a drying thereof, also called vacuum evaporation, inasmuch as the pressure is fairly low (see FIG. 1). Since evaporation is an endothermic process, the latter leads to a cooling of the food product, and therefore a rapid degradation of the drying efficiency of the vacuum pumps.

Evaporative vacuum drying offers the advantage of partly obviating the geometry of the product.

In effect, if the propagation of the pressure waves has a limited speed, when balanced, the pressure of a medium is quasi-isotropic, notably in its communicating gaseous phase. Thus, compared to conventional drying methods in limiting internal transfer conditions, vacuum evaporation allows for a more uniform drying throughout the thickness of the product, which may make it possible to reduce the occurrence of a crusting phenomenon.

However, it is also possible to improve the uniformity of the drying between the core and the outer skin of the product obtained on completion of the known vacuum drying methods.

In effect, during the vacuum evaporation of the water from a solid food product, the water in contact with the outside medium (outer skin, occlusive internal surface) is likely to evaporate, but the evaporative effect is however more marked in the areas in significant contact with the outside medium (outer skin) and less marked in the areas having a reduced specific area of contact (core of the product).

Consequently, a drying gradient between the core and the outer skin of the food product is obtained, which is less marked than in the implementation of conventional drying methods, but which may still prove significant.

It is, moreover, known practice, notably from EP 1 066 762, to heat a food product before drying it by vacuum evaporation. A vacuum drying performed on a food previously heated to 20° C. may result in a loss of approximately 5% of the weight of water present before drying and to a cooling of the product to 0° C., and, ultimately, to the freezing of said product. The dehydration obtained at the end of such a drying may, however, be improved.

Furthermore, the production of salting products and of certain meats may include a number of steps, notably salting, drying and baking steps.

In the case of products intended for drying, the conventional salting methods rely on a dry salting by placing the food in contact with the salt, either in excess, or by dosing. Some methods based on immersion in brine persist and certain manufacturers still use mixers to perform the salting of their cuts.

Of the operations of the so-called "hot" phase, the drying and baking are convective, with the notable consequence that the internal transfer of material such as heat is limiting.

The consequences for the transformer are the risk of crusting if the surface dehydration is too rapid and the length of the drying if the products are thick.

Conventionally, the salting and baking-drying operations are sequenced and the second—qualified as "hot"—is initiated only when the salting is finished inasmuch as it is uniform between the outer skin and the core of the product.

Salting with dry salt may be a relatively slow process first requiring the ingredients to be dissolved at the level of the outer skin of the product before their migration from the outer skin to the core. This migration obeys diffusion laws, which means that dry salting is a particularly slow operation. For 9 kg hams, practice recommends saltings of 9 to 13 days depending on the cut and the quality of the hams used. At the end of this phase, the ingredients have penetrated the food and the product has lost approximately 3 to 6% of its weight but the core diffusion is not finished.

A multiple-phase rest operation may prove necessary in order to obtain a product that is uniformly salted. The duration of this rest period may be approximately 1 month.

After rest, the weight losses represent approximately 10%. Here again, the slowness of the diffusive mechanisms involved in the phenomena explains the significant duration of the operation.

During the salting and rest period, the temperature is maintained below 5° C. This is called cold phase. The objective is to minimize the development of pathogenic flora and deterioration.

Once the ham is salted to the core in a balanced fashion, the stabilization obtained makes it possible to switch to hot phase and conduct the drying, refining and baking operations. While the low temperature slows down bacterial development, the product remains non-stabilized throughout the salting and rest period.

There is a need to improve the dehydration obtained by the known drying methods.

There is a need to have available methods producing a drying that is as uniform as possible between the outer skin and the core of a food product.

There is also a need to have faster and more effective product preparation methods.

The invention aims specifically to meet all or some of the abovementioned needs.

According to a first aspect, the invention relates to a method for drying a food product, comprising steps consisting in:
   a) introducing the food product into an enclosure, the enclosure being defined by the tank of a mixer, and
   b) drying the food product present in the enclosure by applying a vacuum to the enclosure,
in which method heat is applied to the product present in the enclosure when the vacuum is applied to the enclosure during the step b) so as to keep the temperature of said product constant and/or increase it during all or part of the drying by the application of a vacuum to the enclosure, the heat being applied by heat transfer between at least one heat transfer fluid and the product and/or by irradiation of said product by an electromagnetic radiation.

Preferably, the vacuum level used in the enclosure during this step corresponds to an absolute pressure less than 200 mbar, better less than 100 mbar, better less than 75 mbar, even better less than 40 mbar.

In effect, the lower the pressure, the lower the temperature has to be to evaporate a given quantity of water within a given time period. It is therefore important for the pressure to be sufficiently low, so as not to have to overheat the product during the drying step. In particular, it may be important not to cook the product during the drying step.

The pressure and temperature conditions during the drying step may be chosen so as to obtain the range of the phase diagram of pure water where the latter is in the gaseous state.

The invention advantageously makes it possible, by neutralizing the endothermy of the evaporation by an application of heat to the product, to improve the dehydration of the product obtained on completion of the vacuum drying step. The heat may notably be applied by means of a heating step.

The temperature of the enclosure and/or of the product in the enclosure being brought to or maintained at values that are variable according to the technological objective:

for a simple neutralization of the latent evaporation heat, the temperature may be set between 0 and 10° C., notably in the case of pre-dried lean meat for manufacturing dry sausage;

for a cold treatment of relatively thick products such as cured or dry ham, the temperature may reach 10 to 25° C.;

for a hot treatment of products such as hot-baked bacon or salted meat, the temperature may reach 25 to 55° C.

As detailed hereinbelow, it is also possible within the context of the invention to induce a given temperature profile between the core and the surface, for example, by creating a temperature gradient between a colder outer skin and the hotter core of the product. In these conditions, a more uniform drying in the product is advantageously obtained.

"Mixer" should be understood to be a device suitable for setting the food product in motion by setting the enclosure in motion and/or through the presence of a stirring member therein.

"Application of heat to the product" should be understood to mean that the product effectively receives energy by virtue of the heat transfer with the heat transfer fluid, for example directly or via a double jacket, and/or irradiation. This application of heat makes it possible for the product not to be cooled during all or part of drying by the application of the vacuum to the enclosure.

The food product may be a meat product. The invention is not however limited to the application to meat products but may be applied to other products such as, for example, fish-based food products.

The mixer may be equipped with a rotary tank. The tank may be rotary in relation to its longitudinal axis, which is substantially horizontal or, if appropriate, inclined in relation to the floor. The food product may be set in motion by the rotation of the tank. The tank may be set in rotation during all or part of the step b).

The mixer is, as a variant, equipped with a stirring member, for example a rotary paddle, a rotary axis or a rotary arm. The food product may be set in motion by the stirring member. The tank may, when the mixer is equipped with a stirring member, be fixed or pivoting. The stirring member and/or the tank may be set in motion during all or part of the step b).

In a preferred variant, the food product is set in motion in the enclosure during all or part of the drying by the application of the vacuum to the enclosure. The product undergoes, for example, during all or part of the drying by the application of the vacuum to the enclosure, a mixing by repeated overturning by virtue of the rotation of the tank.

Setting the food product in motion advantageously makes it possible to improve the drying of the food product because of the mix produced. This mix enables the different products present in the enclosure to emerge each in turn from the batch as a whole.

The application of the vacuum to the enclosure, during the step b), may be imposed continually throughout the drying step (i.e. without interruption throughout the drying step) or be interrupted then restarted one or more times.

Advantageously, the pressure inside the enclosure is, during all or part of the step b), less than or equal to 40 mbar (millibar), preferably between 1 mbar and 32 mbar, preferably between 2 mbar and 20 mbar, preferably between 2 mbar and 8 mbar.

The step b) may have a duration of between 2 hours and 12 days, preferably between 1 day and 8 days.

In an exemplary embodiment, the food product has lost, at the end of the step b), a weight equal to at least 4% of its weight taken before the implementation of the step b), preferably a weight equal to at least 8%, even 10%, of its weight taken before the implementation of the step b).

In an exemplary embodiment, the food product may lose, per day, during the step b), a weight of between 1% and 10% of its weight taken before the implementation of the step b).

In an exemplary embodiment, the heat transfer fluid is placed in contact with the food product during all or part of the step b).

In an exemplary embodiment, the enclosure is a double-jacketed enclosure. In this case, the double jacket may be fed by a hot network, notably with glycol water.

The double jacket may be present on a wall of the enclosure and/or on an internal member present in the enclosure, notably on the stirring member.

In particular, the network may comprise a system of valves, notably using a valve of three-way type. The hot network may for example be heated by an electric preheater and/or an exchanger (for example plate exchanger or tubular exchanger) fed by a heat exchanger fluid, notably by hot water or steam.

As a variant, the double jacket may be fed by a heated/refrigerated unit.

In the exemplary embodiment in which the application of heat is, during all or part of the step b), produced by heat transfer between the food product and at least one heat transfer fluid, the heat transfer fluid preferably circulates within a double jacket of the enclosure. The heat transfer fluid may circulate in a double jacket present on a wall of the enclosure and/or in a double jacket present on an internal member of the enclosure, notably on the stirring member.

In an exemplary embodiment, the heat transfer fluid is air or dry or superheated steam.

In an exemplary embodiment, the electromagnetic radiation used in the step b) is a microwave and/or radiofrequency radiation.

"Microwave" radiation should be understood to mean a radiation of a frequency between 1 GHz and 300 GHz.

When a microwave radiation is applied, a microwave generator, for example a magnetron, may be present in the enclosure or be linked thereto by a microwave conveyance means, for example by a waveguide and/or a coaxial cable.

"Radiofrequency" radiation should be understood to mean a radiation of a frequency less than or equal to 3000 GHz.

In a preferred variant, the temperature of the food product increases during the step b). The temperature of the food product during the step b) may increase strictly monotonically. As a variant, the temperature of the food product may, during the step b), increase while exhibiting levels at which the temperature is constant.

The temperature of the food product, during all or part of the step b), may be between 4° C. and 50° C., preferably between 4° C. and 24° C.

The temperature of the food product at the end of the step b) may be greater than or equal to 6° C., preferably 7° C., for example greater than or equal to 8° C., for example 12° C.

In a preferred variant, the method further comprises a step c) of baking, in which the enclosure is preferably raised to a temperature greater than or equal to 20° C., preferably between 22° C. and 55° C., and to a pressure greater than or equal to 24 mbar, preferably between 200 mbar and 1020 mbar.

Conducting such a baking step is advantageous because it makes it possible to promote the oxidation of the fatty matters, this oxidation constituting one of the main mechanisms involved in the aromatic development of meat food products, notably salted meat products.

The step c) is, for example, initiated after the end of the step b), and may be conducted in the mixer.

Such an aggregation of phases within one and the same mixer advantageously results in productivity gains, floor space gains, significantly limited waste, improved product health quality and time savings that are particularly significant.

In a preferred variant, a temperature of an outer skin of the food product is, before the implementation of the step b), less than a temperature of the core of the food product.

"Outer skin" should be understood to mean a peripheral volume of the product extending along all or part of the outer surface of said product. This volume separates the core of the product from the outside medium, the core of the product being situated at a greater depth within the product than the outer skin.

This feature advantageously makes it possible to balance the drying kinetics at the core and on the surface, by the artificial creation of a temperature differential between the core and the outer skin before subjection to an evaporative vacuum, and to induce a more uniform drying between the outer skin and the core.

In this case, the water from the outer skin is evaporated more slowly whereas the water from the core, hotter, is evaporated more quickly. There is a consequential limitation on the drying gradient between the outer skin and the core of the product and a reduction in the risk of crusting. This drying method is qualified as "hot-cold-dry" (HCD).

This temperature differential may be obtained by an alternating time-related management of hot and cold application, by any means known to those skilled in the art. The temperature differential may be obtained cyclically by alternating heating, homogenization, cooling, vacuum evaporation and by repeating this cycle as many times as is necessary.

The temperature difference between the core and the outer skin of the food product may, before the implementation of the step b), be greater than or equal to 0.3° C., preferably 5° C.

In an exemplary embodiment, the outer skin of the product extends to a depth of at least 0.5 mm, notably 1 mm, notably 5 mm, notably 1 cm, of the food product.

The temperature difference between the core and the outer skin of the food product may be obtained by the implementation of the following steps:
  i) heating of the food product,
  ii) optionally, stabilization of the temperature of the food product obtained on completion of the step i),
  iii) surface cooling of the food product obtained on completion of the steps i) or ii), so as to obtain a temperature of the outer skin of the food product less than the temperature of its core.

The heating of the step i) is advantageously as uniform as possible.

In a preferred variant, the succession of the steps i) to ii) and of the step b) or i) to iii) and of the step b) is repeated.

The following cycle may therefore be performed a number of times:
  step i), then
  optionally, step ii), then
  step iii), then
  step b), then
  return to step i).

In a preferred variant, a salting of the food product is performed, the salting preferably taking place before the step b) and/or during all or part of the step b). The salting may or may not be performed in the enclosure of the mixer used for the vacuum drying.

The combination of the salting and of the drying in the same mixer advantageously makes it possible to continue the salting throughout the drying and therefore reduce the salting time, since a part of this step is performed during the drying.

In a variant, a salting by wet means is performed, the food product notably being in contact with a brine during the salting. The food product may be placed in contact with a brine directly introduced into the mixer or by injection of the brine into the product before the mixing by means, for example, of an injector.

A salting by wet means advantageously makes it possible to improve the salting produced.

The duration of the salting performed may be between 1 hour and 7 days.

In a preferred variant, the food product undergoing the step b) exhibits one or more cut-outs, notably formed before implementation of the step b).

The presence of one or more cut-outs advantageously makes it possible to speed up the dynamics of evaporative drying and, if appropriate, of salting. In effect, the porosity of the food product is increased, which speeds up all of the (non-diffusional) hydrodynamic mechanisms performed by conducting the operations in a vacuum such as vacuum infiltration of the ingredients and expulsion of the steam from the core of the product during the evaporative vacuum drying.

In an exemplary embodiment, cuts may be formed using a matrix of blades and/or needles by a method called slashing, micro-slashing or tenderizing, or using rotary blades by a so-called laceration or "steakage" method.

In a preferred variant, the food product undergoes, after the end of the step b), a step d) of shaping, notably by means of a press.

The step d) advantageously comprises a product vacuum-packaging step.

Using a mixer to perform an evaporative vacuum drying and, where appropriate, a salting and/or a baking, advantageously makes it possible to obtain a semi-finished product or a finished product. Thus, on leaving the mixer, the product may advantageously be shaped.

Particularly preferentially, the food product is chosen from the following list: cured ham, coppa, thinly-sliced dried beef, turkey fillet, small pieces of beef, pieces of thin cut beef intended for manufacturing sausage.

According to another of its aspects, the present invention relates to a dried food product, notably meat, characterized in that it is obtained by a method as described above.

Such a product advantageously exhibits a relatively low rate of hydration after drying.

According to another of its aspects, the invention relates to the use of an application of heat to a food product, notably a meat food product, undergoing, in an enclosure defined by the tank of a mixer, a step of drying by the application of a vacuum to the enclosure, to improve the dehydration of said product.

In a preferred embodiment, the application of heat is produced by heat transfer between at least one heat transfer fluid and the product and/or by irradiation of said product by an electromagnetic radiation.

As explained above, the product may be set in motion during all or part of the vacuum drying step.

The method according to the invention may also be combined with the use of software for tracking parameters linked to the treatment of the food products, notably time, temperature, pressure and/or the weight of the product.

Figure 2:
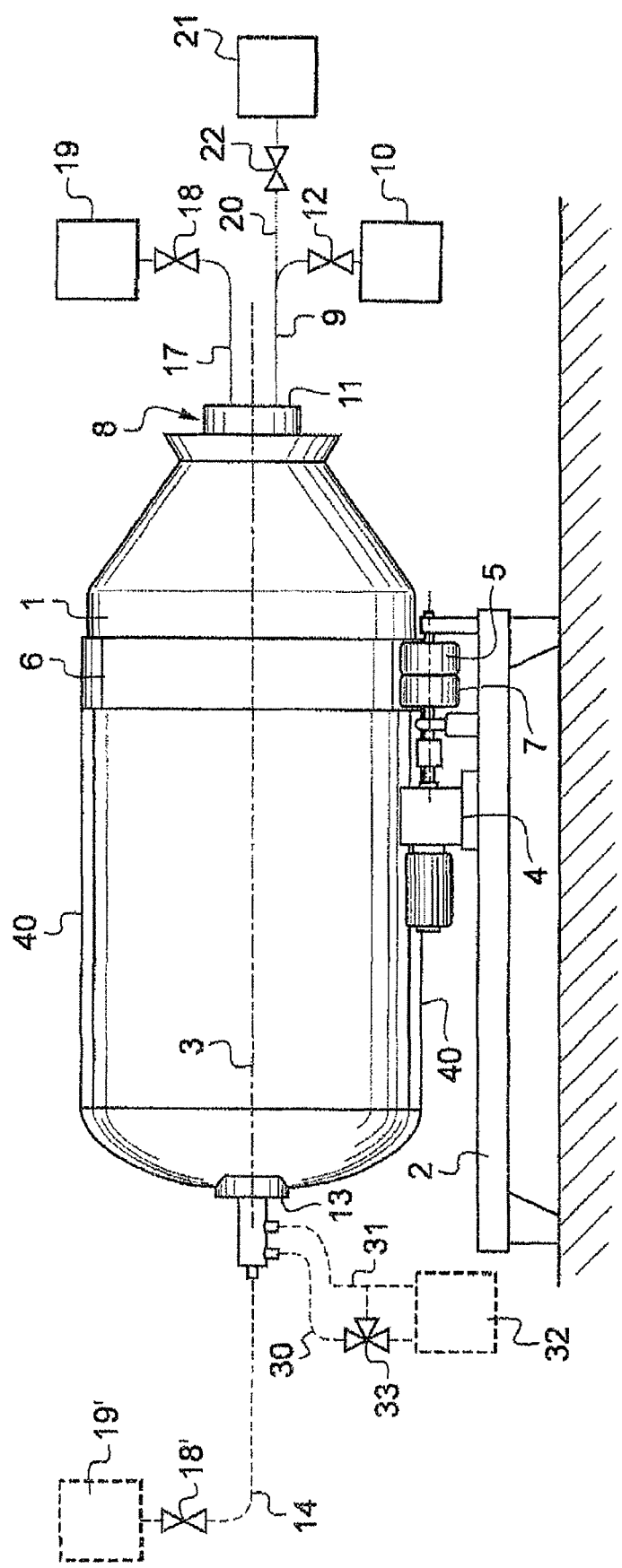
Figure 3:
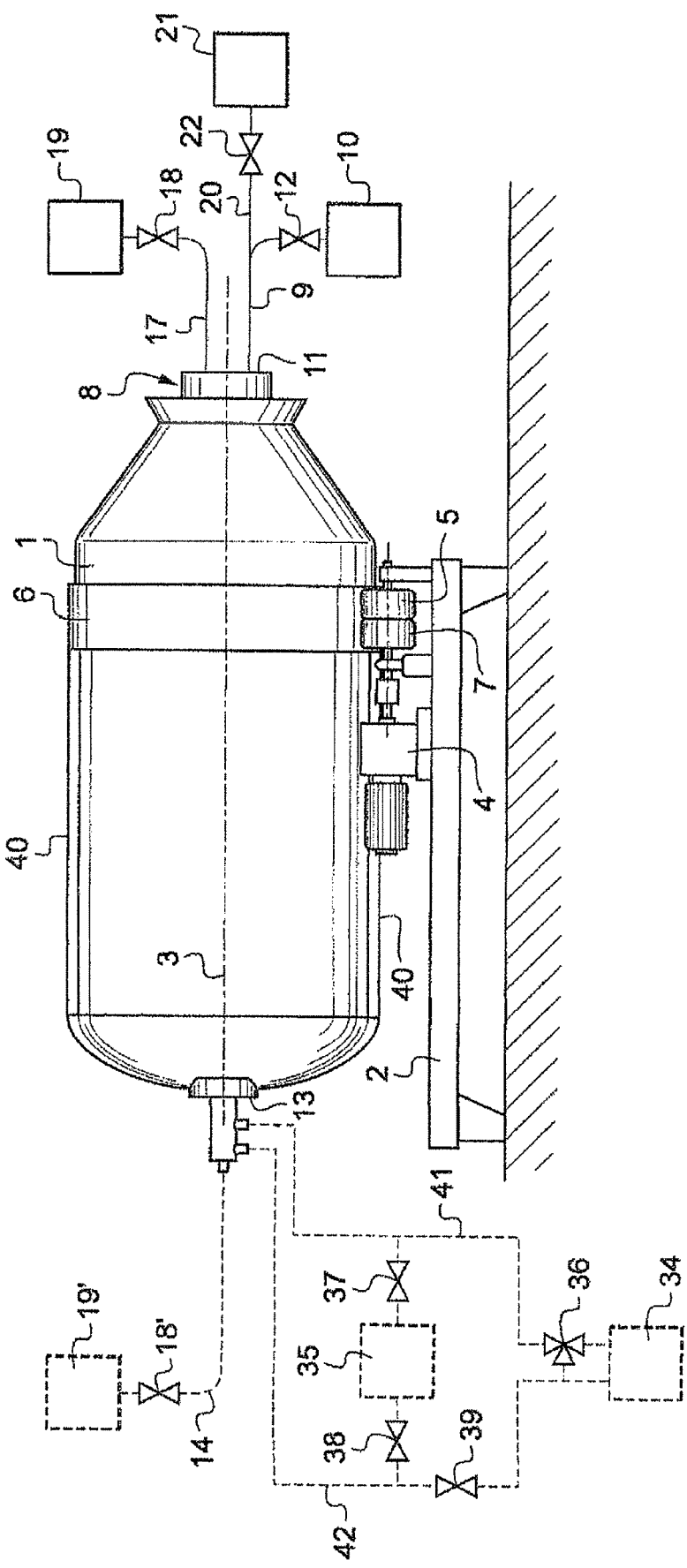
Figure 4:
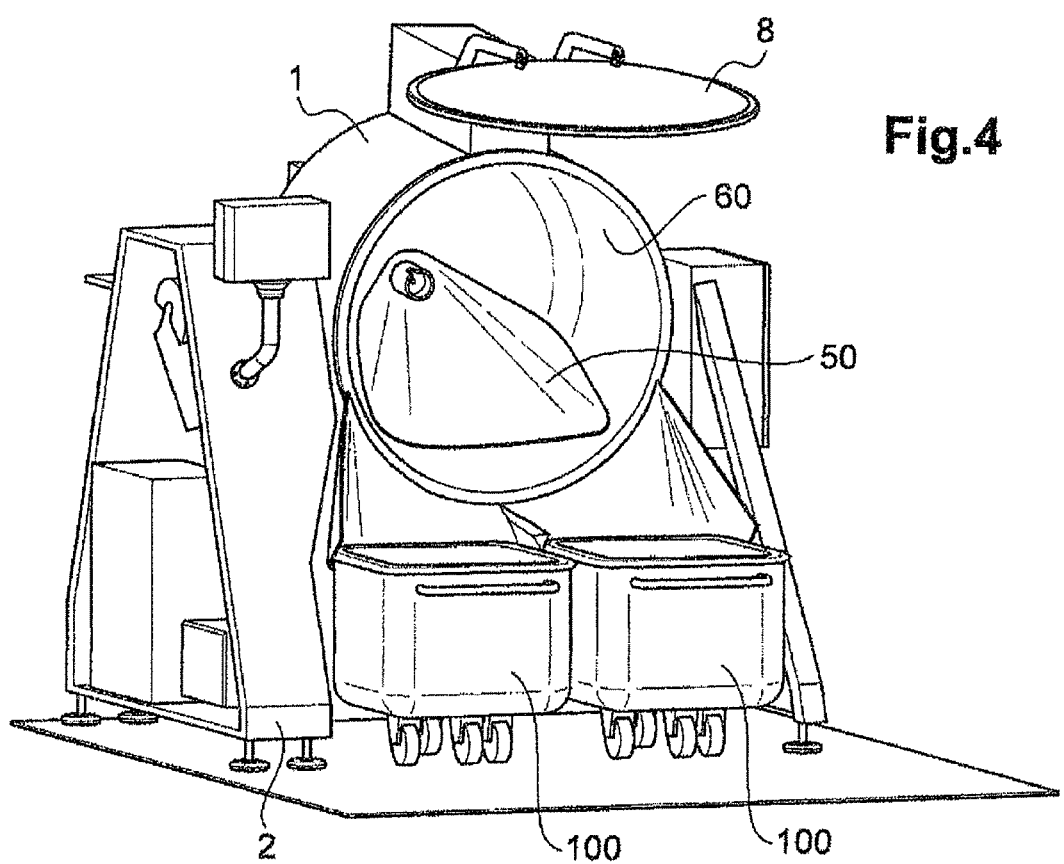

In order to enable a better understanding of the invention, there now follows a description of exemplary embodiments of the method according to the invention with reference to the attached drawing in which:

FIG. 1 represents the trend of the boiling point of water as a function of pressure, FIG. 2 represents a longitudinal schematic view of a first exemplary mixer that may be used in the method according to the invention, FIG. 3 represents a longitudinal schematic view of a second exemplary mixer that may be used in the method according to the invention, FIG. 4 represents a view of a mixer that may be used in the context of the methods according to the invention, and FIGS. 5 to 9 represent experimental conditions and experimental results relating to methods according to the invention.

FIG. 2 shows a mixer comprising a tank 1 mounted on a frame 2 about a substantially horizontal axis of rotation 3. A stirring means such as a straight or helical paddle (not represented) is provided inside the tank.

To drive the tank 1 in rotation, the frame 2 comprises a motor 4 rotationally secured to a driving member 5.

The tank comprises a peripheral friction area 6 which cooperates with a friction wheel 7 of the driving member 5.

The front part of the tank, situated on the right in the drawing, has a convergent tapered form, at the end of which there is a leak-tight door 8 which makes it possible to load and unload the food products to be treated into and from the tank 1.

A pipeline 9 linking the interior of the tank 1 to a vacuum pump 10 penetrates into the central part of the leak-tight door making it possible to apply the primary vacuum in the tank, the pipeline 9 being provided with a valve 12.

A pipeline 20 is connected to the pipeline 9 and provided with a valve 22 linking the interior of the tank to a powerful vacuum generator 21.

The vacuum implemented for the step b) may be obtained using a powerful vacuum pump (for example: vane pump, liquid ring pump, screw pump, etc.) that may be coupled to a low vacuum booster (roots), an ejector if necessary being able to be added to this setup. The throughput of the vacuum pump may be approximately: 0.1 to 5.0 $m^3$/h per kg of food product treated.

There may also be a pipeline 14, linked to a vapor generator 19 and provided with a valve 18, penetrating into the central part of the tank.

The pipelines 9 and 17, in the example of FIG. 1, are provided with a revolving coupling 11 which allows the rotation of the tank 1 about its axis 3 without damage to the pipelines. The pipeline 17 is linked directly to the interior of the tank 1 through the door 8 and the rotating coupling 11.

A pipeline 14, linked to a vapor generator 19' and provided with a valve 18', may also penetrate into the rear of the tank 1 (on the left in the drawing). The pipeline 19' penetrates into the tank 1 through a rotating coupling 13 situated at the rear of the tank 1.

A heated/refrigerated unit 32 is linked to the double jacket 40 of the tank 1 via pipelines 30 and 31 provided with a valve 33. This heated/refrigerated unit 32 makes it possible to apply heat to the food product when the vacuum is applied to the enclosure.

FIG. 3 shows another mixer comprising a tank 1.

In this example, a network of glycol water replaces the heated/refrigerated unit 32 described in FIG. 2. In the example of FIG. 3, the glycol water makes it possible to apply heat to the food product when the vacuum is applied to the enclosure.

The network of glycol water comprises a glycol water generator 34 and an exchanger (for example plate exchanger or tubular exchanger) 35. As a variant, the exchanger 35 could be replaced by an electric preheater.

The glycol water network also comprises a system of valves 36, 37, 38 and 39, notably valves of three-way type, the valves 37 and 38 being situated on either side of the exchanger 35.

Two pipelines 41 and 42 make it possible to also link the glycol water network to the double jacket 40 of the tank 1.

FIG. 4 shows a mixer in which the leak-tight door 8 is in the open position. As represented, a stirring member 50, which may be a paddle as represented or an arm or an articulated mixer axis, is present in the enclosure 60 in which the food product is intended to be introduced. The mixer may be vertical or else horizontal, of dough mixer type. One or more containers 100 are present outside the tank so as to be able to receive the dried food product after the implementation of the method according to the invention.

The invention is not limited to the exemplary embodiments which have just been described.

Figure 5:
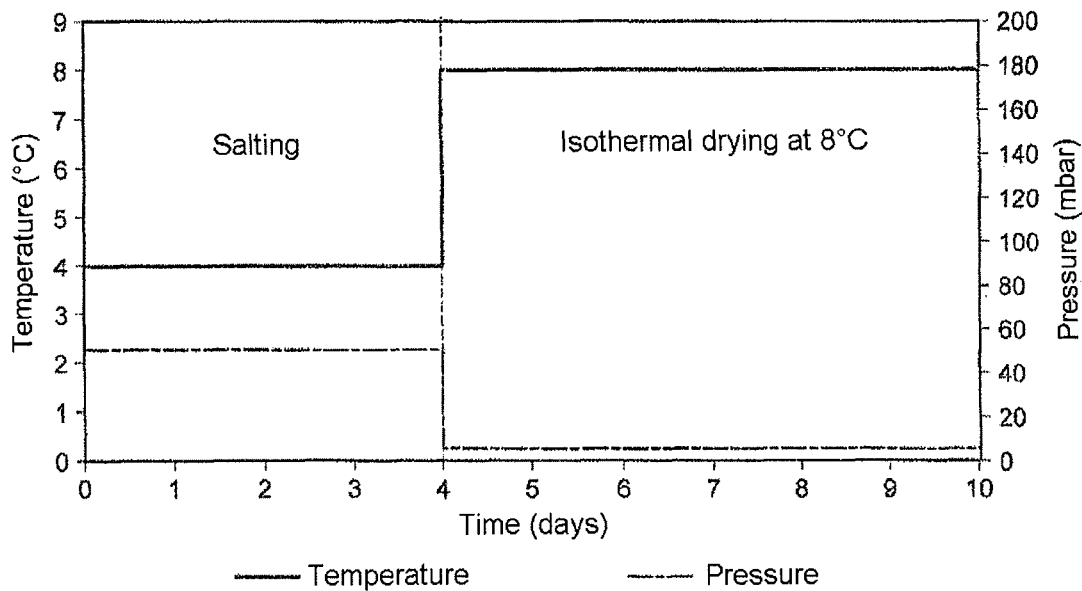

FIG. 5 shows the conditions of a method according to the invention in which a salting is initiated before an evaporative vacuum isothermal drying. The salting performed has a duration of 4 days and was performed at 4° C. and the temperature of the product is maintained at 8° C. during the evaporative vacuum isothermal drying. The food products implemented are open pork hams.

The pressure imposed during at least a part of the salting step may be greater than or equal to 20 mbar, preferably 25 mbar, preferably 30 mbar.

In the conditions of FIG. 5, water losses higher than 6% in vacuum drying in isothermal conditions at 8° C. were obtained.

Figure 6:
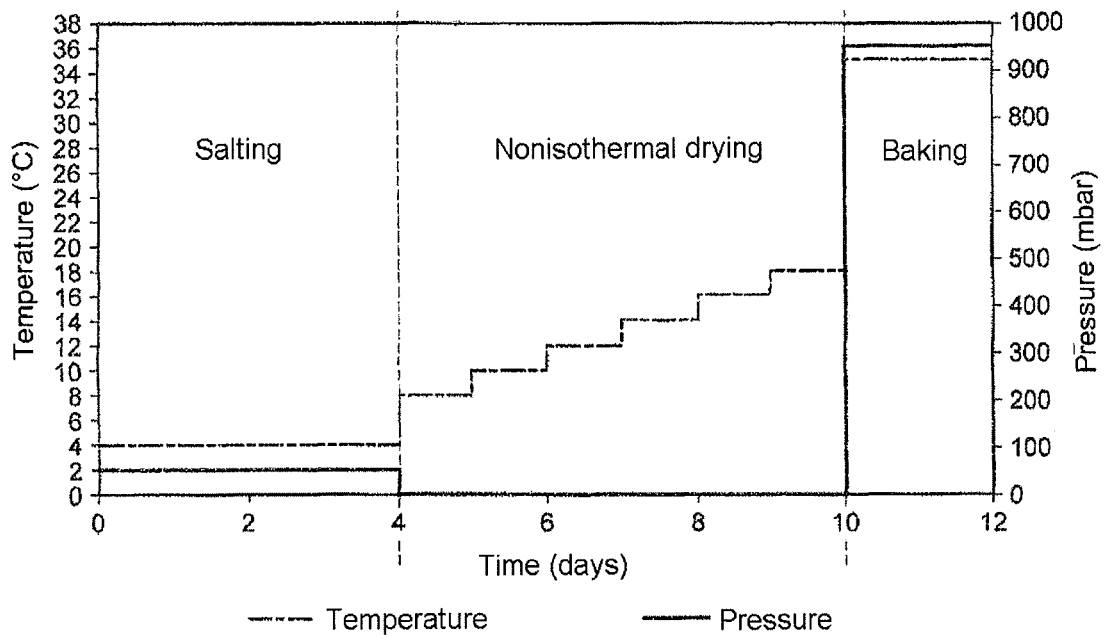

In order to further speed up the process, it is possible to conduct the vacuum evaporation by gradually increasing the temperature of the product so as to maintain a good evaporative potential as the activity of the water of the product decreases (FIG. 6). The conditions of FIG. 6 are as follows: salting for 4 days at 4° C., drying at a temperature increasing from 8 to 18° C. in evaporative vacuum, and baking of open pork hams at 35° C.

A high-temperature baking may be conducted at atmospheric pressure or in a very weak vacuum to promote the contact with oxygen, or even in a stronger vacuum—possibly with pulsed vacuum or lung vacuum cycles—for the food to remain in contact with the oxygen (FIG. 6).

Figure 7:
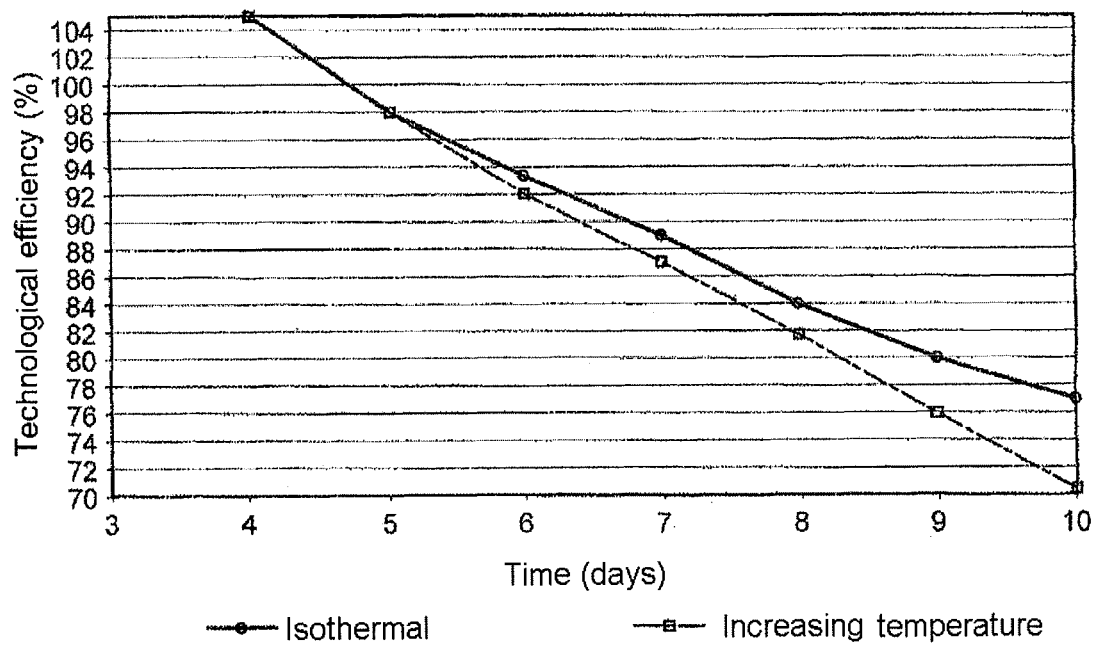

FIG. 7 compares the relative efficiencies of drying in evaporative vacuum in isothermal conditions and in increasing temperature conditions.

From a health point of view, the progressive rise in temperature of the meat is made possible by the rapid and simultaneous lowering of the activity of the water of the product. The implementation of a drying in variable temperature conditions leads to more significant drying (FIG. 7).

Figure 8:
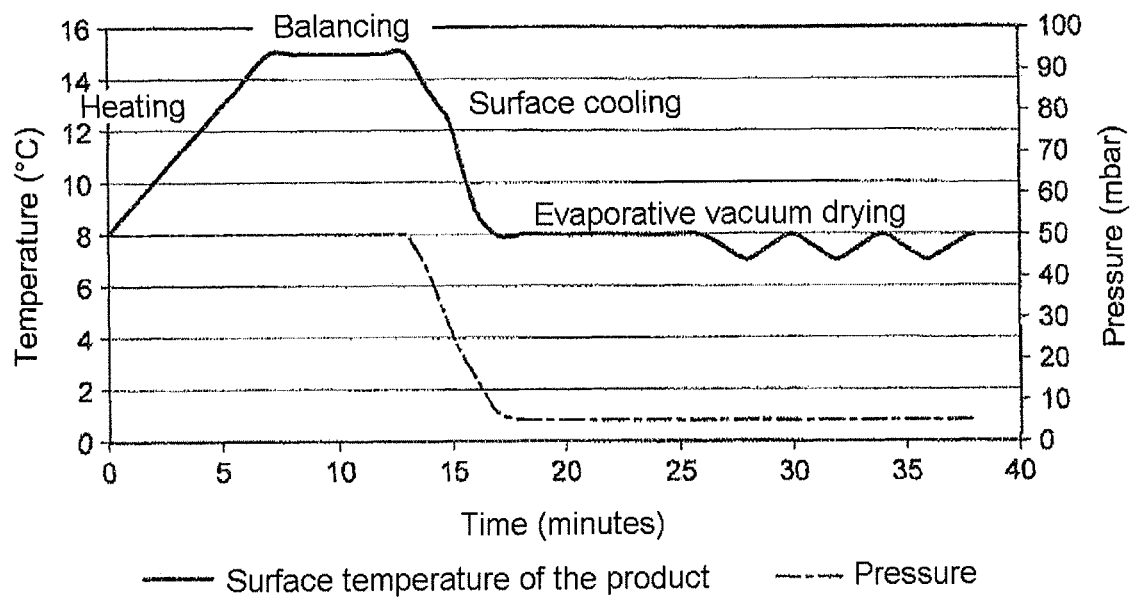

FIG. 8 shows an exemplary cycle making it possible to produce a more uniform drying between the core and the outer skin when the product is subjected to an evaporative vacuum.

The product first undergoes a heating step in order to heat the product as uniformly as possible.

This heating step (step i)) may have a duration of between 10 minutes and 24 hours, preferably between 30 minutes and 8 hours, preferably between 1 hour and 4 hours.

Once the product is heated as uniformly as possible, it undergoes a step of balancing of its temperature (step ii)).

A step of surface cooling is then conducted so as to cool the outer skin of the product more than its core before the implementation of the evaporative drying.

The surface cooling step may be performed using a double jacket fed with cooled heat-transfer fluid, by direct injection of a cryogenic fluid or simply by increasing the vacuum of the medium in which the food product is placed.

Figure 9:
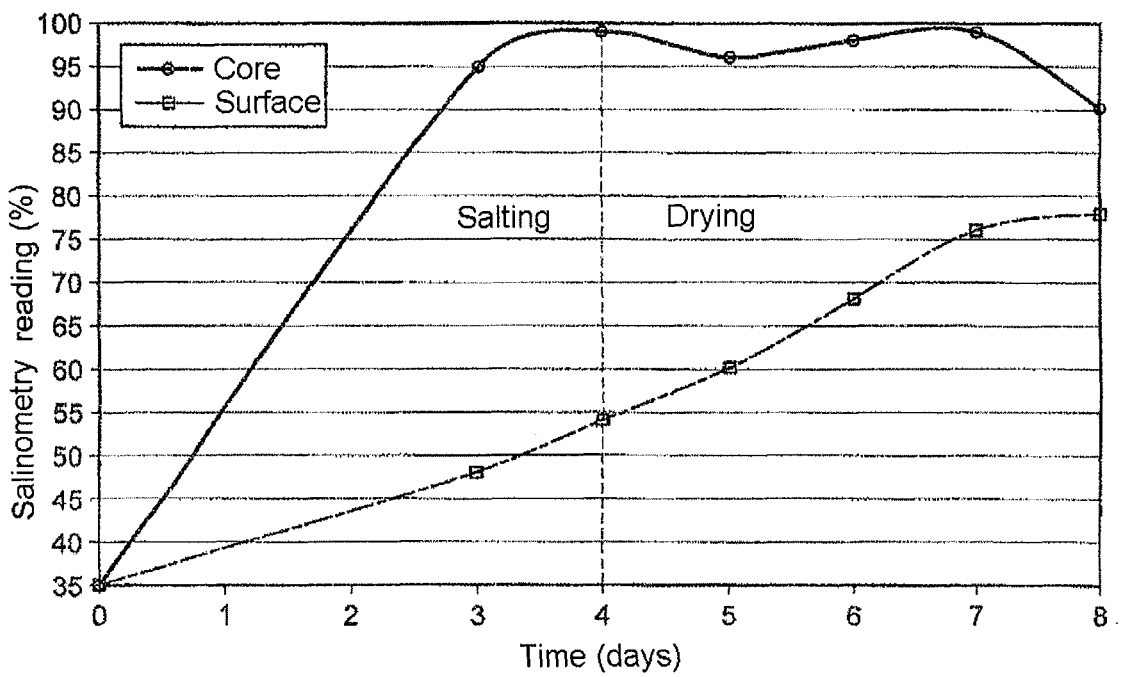

FIG. 9 shows the trend of the salinometry value on the surface and at the core of a ham deboned according to the so-called tunnel boning method, salted and dried in evaporative vacuum in a mixer.

The speed of the drying produced in evaporative vacuum in the mixer makes it possible to consider formulating products intended for drying by wet means (brine) in order to further speed up the salting.

The expression "comprising a" should be understood to mean "comprising at least one".

The expression "lying between . . . and . . . " or "ranging from . . . to . . . " should be understood to include the bounds.

The invention claimed is:

1. A method for drying a food product, the food product having a core surrounded by an outer surface, the method comprising:
   a) introducing the food product into an enclosure, the enclosure being defined by a tank of a mixer with a double jacket in which at least one heat transfer fluid circulates;
   b) heating the food product in the enclosure by application of heat transfer between the at least one heat transfer fluid circulating within the double jacket of the enclosure and the food product;
   c) stabilizing the temperature of the food product;
   d) cooling the outer surface of the food product upon completion of the step c) to create a temperature differential between the outer surface of the food product and the core of the food product in which an outer surface temperature of the food product is less than a core temperature of the food product; and
   e) drying the food product present in the enclosure by applying a vacuum to the enclosure with a pressure less than or equal to 200 mbar and applying heat at a temperature chosen so as to obtain the range of the phase diagram of pure water where the pure water is in the gaseous state, the applying of the vacuum to the enclosure during step e) being initiated at a first time point and concluded at a second time point,
   wherein the heat is applied to the food product present in the enclosure when the vacuum is applied to the enclosure during the step e) so as to keep the temperature of the food product constant or increase it during all or part of the step e), and
   wherein the heat is applied to the food product present in the enclosure when the vacuum is applied to the enclosure during the step e) such that the temperature of the food product at the second time point is greater than or equal to the temperature of the food product at the first time point, and
   wherein the heat applied in the step e) is applied by further heat transfer between the at least one heat transfer fluid circulating within the double jacket of the enclosure and the food product, in which the duration of step e) is chosen so that the food product has lost, at completion of the step e), a weight equal to at least 4% of its weight taken before the implementation of the step e).

2. The method as claimed in claim 1, wherein the pressure in the enclosure during all or part of the step e) is less than 100 mbar.

3. The method as claimed in claim 1, further comprising salting the food product, the salting taking place before the step e) and/or during all or part of the step e).

4. The method as claimed in claim 3, wherein the salting is performed by wet means, the food product being in contact with a brine during the salting.

5. The method as claimed in claim 1, further comprising a step f) of baking, in which the enclosure is raised to a temperature greater than or equal to 20° C., and to a pressure greater than or equal to 24 mbar.

6. The method as claimed in claim 5, wherein the step f) is initiated after the step e) at the second time point.

7. The method as claimed in claim 1, wherein the food product undergoing the step e) exhibits one or more cut-outs.

8. The method as claimed in claim 1, wherein the food product undergoes, after a step b a step e), of shaping, by means of a press.

9. The method as claimed in claim 1, wherein the food product is set in motion within the enclosure during all or part of the step e).

10. The method of claim 2, wherein pressure is less than 75 mbar.

11. The method of claim 2, wherein pressure is less than 40 mbar.

12. The method of claim 5, wherein at the step f), the temperature within the enclosure is raised between 22° C. and 55° C. and to a pressure within the enclosure is raised between 200 mbar and 1020 mbar.

13. The method of claim 1, wherein the food product has lost, at completion of the step e) a weight equal to at least 10% of its weight taken before the implementation of the step b).

14. The method of claim 1, wherein the steps b), c) and d) are repeated at least once prior to proceeding to step e.

15. The method of claim 7, wherein the cut-outs are formed before implementation of the step e).

16. The method of claim 1, wherein the pressure in the enclosure during all or part of the step e) is from 2 to 20 mbar.

17. The method of claim 1, wherein the temperature differential between the outer surface of temperature of the food product and the core temperature of the food product is at least 0.3° C.

18. The method of claim 1, wherein the temperature differential between the outer surface of temperature of the food product and the core temperature of the food product is approximately 5° C.

19. A method for drying a food product, the food product having a core surrounded by an outer surface, the method comprising:
  a) introducing the food product into an enclosure, the enclosure being defined by a tank of a mixer with a double jacket in which at least one heat transfer fluid circulates;
  b) heating the food product in the enclosure by irradiation of the food product by electromagnetic radiation;
  c) stabilizing the temperature of the food product;
  d) cooling the outer surface of the food product upon completion of the step c) to create a temperature differential between the outer surface of the food product and the core of the food product in which an outer surface temperature of the food product is less than a core temperature of the food product; and
  e) drying the food product present in the enclosure by applying a vacuum to the enclosure with a pressure less than or equal to 200 mbar and applying heat at a temperature chosen so as to obtain the range of the phase diagram of pure water where the pure water is in the gaseous state, the applying of the vacuum to the enclosure during step e) being initiated at a first time point and concluded at a second time point, wherein the heat is applied to the food product present in the enclosure when the vacuum is applied to the enclosure during the step e) so as to keep the temperature of the food product constant or increase it during all or part of the step e), and wherein the heat is applied to the food product present in the enclosure when the vacuum is applied to the enclosure during the step e) such that the temperature of the food product at the second time point is greater than or equal to the temperature of said food product at the first time point, wherein the heat applied in the step e) is applied by further irradiation of the food product by the electromagnetic radiation.

* * * * *